United States Patent
Hwang

(10) Patent No.: US 9,768,933 B2
(45) Date of Patent: Sep. 19, 2017

(54) METHOD AND APPARATUS FOR PERFORMING RETRANSMISSION OPERATION IN DEVICE TO DEVICE COMMUNICATION SYSTEM

(71) Applicant: Samsung Electronics Co., Ltd., Suwon-si, Gyeonggi-do (KR)

(72) Inventor: Pil-Yong Hwang, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 148 days.

(21) Appl. No.: 14/264,513

(22) Filed: Apr. 29, 2014

(65) Prior Publication Data

US 2014/0321293 A1 Oct. 30, 2014

(30) Foreign Application Priority Data

Apr. 29, 2013 (KR) .................. 10-2013-0047524

(51) Int. Cl.
| | |
|---|---|
| *H04L 5/00* | (2006.01) |
| *H04W 76/02* | (2009.01) |
| *H04W 24/08* | (2009.01) |
| *H04L 1/18* | (2006.01) |
| *H04L 1/16* | (2006.01) |
| *H04L 1/00* | (2006.01) |

(52) U.S. Cl.
CPC .......... *H04L 5/0055* (2013.01); *H04L 1/1692* (2013.01); *H04L 1/18* (2013.01); *H04L 1/1893* (2013.01); *H04L 1/1896* (2013.01); *H04W 24/08* (2013.01); *H04W 76/023* (2013.01); *H04L 2001/0093* (2013.01)

(58) Field of Classification Search
CPC ............................ H04L 5/005; H04W 76/023
See application file for complete search history.

(56) References Cited

U.S. PATENT DOCUMENTS

| | | | |
|---|---|---|---|
| 2009/0232086 A1 | 9/2009 | Li et al. | |
| 2010/0091721 A1* | 4/2010 | Larmo | H04L 1/188 370/329 |
| 2010/0251058 A1* | 9/2010 | Chandra | H04L 1/1838 714/751 |
| 2010/0272048 A1* | 10/2010 | Pan | H04L 1/1635 370/329 |

(Continued)

FOREIGN PATENT DOCUMENTS

| | | | | |
|---|---|---|---|---|
| KR | 10-2009-0116601 A | 11/2009 | | |
| KR | WO 2013115567 A1 * | 8/2013 | .......... | H04L 1/1854 |

(Continued)

*Primary Examiner* — Benjamin Lamont
(74) *Attorney, Agent, or Firm* — Jefferson IP Law, LLP

(57) ABSTRACT

A method for performing by a mobile station (MS) a retransmission operation in a device to device (D2D) communication system is provided. The method includes performing a data communication with a peer MS using a D2D communication, receiving feedback information for a retransmission operation for data which is transmitted to the peer MS which is transmitted using a resource block mapped to identification information of a D2D connection from the peer MS, determining whether there is need for retransmission of the data based on the feedback information received from the peer MS, and if there is need for the retransmission of the data, retransmitting the data to the peer MS.

42 Claims, 11 Drawing Sheets

(56) References Cited

U.S. PATENT DOCUMENTS

| | | | |
|---|---|---|---|
| 2011/0106952 A1 | 5/2011 | Doppler et al. | |
| 2011/0126069 A1 | 5/2011 | Kim et al. | |
| 2012/0083283 A1* | 4/2012 | Phan | H04W 72/048 455/450 |
| 2012/0106517 A1* | 5/2012 | Charbit | H04W 72/04 370/336 |
| 2012/0163252 A1 | 6/2012 | Ahn et al. | |
| 2012/0266038 A1* | 10/2012 | Ou | H04L 1/1822 714/748 |
| 2013/0094431 A1* | 4/2013 | Terry | H04L 1/1812 370/315 |
| 2014/0023008 A1* | 1/2014 | Ahn | H04W 76/023 370/329 |
| 2014/0098719 A1* | 4/2014 | Kim | H04W 4/008 370/280 |
| 2014/0112233 A1* | 4/2014 | Bodas | H04W 72/1231 370/312 |
| 2014/0140296 A1* | 5/2014 | Choi | H04J 11/0036 370/329 |
| 2014/0177502 A1* | 6/2014 | Kim | H04L 5/0055 370/311 |
| 2014/0241260 A1* | 8/2014 | Schmidt | H04W 76/023 370/329 |
| 2014/0269767 A1* | 9/2014 | Djukic | H04L 1/1896 370/474 |
| 2014/0362795 A1* | 12/2014 | Choi | H04W 4/005 370/329 |
| 2015/0016318 A1* | 1/2015 | Lee | H04L 5/14 370/280 |
| 2015/0023267 A1* | 1/2015 | Lim | H04L 1/1854 370/329 |
| 2015/0105113 A1* | 4/2015 | Lee | H04W 76/021 455/500 |
| 2015/0208282 A1* | 7/2015 | Grant | H04L 1/18 370/331 |

FOREIGN PATENT DOCUMENTS

| | | |
|---|---|---|
| WO | 2012/071736 A1 | 6/2012 |
| WO | 2013/055175 A2 | 4/2013 |

* cited by examiner

METHOD AND APPARATUS FOR PERFORMING RETRANSMISSION OPERATION IN DEVICE TO DEVICE COMMUNICATION SYSTEM

CROSS-REFERENCE TO RELATED APPLICATION(S)

This application claims the benefit under 35 U.S.C. §119 (a) of a Korean patent application filed on Apr. 29, 2013 in the Korean Intellectual Property Office and assigned Serial number 10-2013-0047524, the entire disclosure of which is hereby incorporated by reference.

TECHNICAL FIELD

The present disclosure relates to a method and apparatus for performing a retransmission operation in a device to device (D2D) communication system. More particularly, the present disclosure relates to a method and apparatus for performing a retransmission operation based on feedback information.

BACKGROUND

Communication among mobile stations (MSs) generally use a base station (BS) (such as a node B, an evolved node B (eNB), or a base transceiver station (BTS), according to a type of a communication system) of a cellular network. The reason is why a scheduling of a radio resource in a BS reduces load and is effective. However, if the location between MSs is short or a device to device (D2D) communication is performed for multiplexing radio resources, and the like, an efficiency of a communication system may be effectively increased.

A typical example of a D2D communication scheme includes a D2D communication scheme which uses a wireless local area network (LAN), a flashlinQ scheme which is proposed by Qualcomm© Corporation in the United States of America, and the like. In the present disclosure, it will be understood that a retransmission scheme includes both a hybrid automatic repeat request (HARQ) scheme and an automatic repeat request (ARQ) scheme unless otherwise specified. In the retransmission scheme for the D2D communication scheme which uses the wireless LAN, a transmitting MS transmits data to a receiving MS, the receiving MS transmits response information ("feedback information for a retransmission operation") such as ACK/NACK information for a retransmission operation indicating whether the receiving MS successfully receives the data to the transmitting MS, and the transmitting MS determines whether a retransmission operation for the data is performed based on the feedback information.

However, in the D2D communication scheme which uses the wireless LAN, resource allocation is possible for one transmitting MS and one receiving MS at one time. So, if (re)transmission data among a plurality of MSs occurs, the plurality of MSs cannot simultaneously (re)transmit the (re)transmission data, so a stable retransmission operation may not be performed. Further, the flashlinQ scheme has not described a retransmission method.

In the D2D communication scheme which uses the wireless LAN, a receiving MS may directly transmit information for a retransmission operation to a transmitting MS. However, resource allocation is possible for one transmitting MS and one receiving MS at one time, so if a plurality of MSs simultaneously perform a retransmission operation, the retransmission operation may not be performed effectively.

In the flashlinQ scheme, a plurality of MSs may simultaneously perform a transmission operation; however, a channel situation from a transmitting MS to a receiving MS is different from a channel situation from the receiving MS to the transmitting MS, so the transmitting MS may not receive information for a retransmission operation stably, and a delay may occur as a result if the transmitting MS performs the retransmission operation.

Therefore, there is a need for a retransmission method that is stable and effective in a D2D communication which uses a wireless LAN.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing a retransmission operation in a device to device (D2D) communication system.

Another aspect of the present disclosure is to provide a method and apparatus for performing a retransmission operation based on feedback information in a D2D communication system.

Another aspect of the present disclosure is to provide a method and apparatus for effectively and stably performing a retransmission operation in a D2D communication system.

Another aspect of the present disclosure is to provide a method and apparatus for performing a retransmission operation in a D2D communication system thereby preventing delay upon transmitting feedback information for the retransmission operation.

Another aspect of the present disclosure is to provide a method and apparatus for effectively performing transmission of hybrid automatic repeat request (HARQ) feedback information and automatic repeat request (ARQ) feedback information for a retransmission operation.

Another aspect of the present disclosure is to provide a method and apparatus for effectively transmitting feedback information for a retransmission operation through a BS included in a cellular communication system in a D2D communication system.

In accordance with an aspect of the present disclosure, a method for performing, by a mobile station (MS), a retransmission operation in a D2D communication system is provided. The method includes receiving feedback information for a retransmission operation for data which is transmitted to the peer MS which is transmitted using a resource block mapped to identification information of a D2D connection from the peer MS, determining whether there is a need for retransmission of the data based on the feedback information received from the peer MS, and if there is a need for the retransmission of the data, retransmitting the data to the peer MS.

In accordance with another aspect of the present disclosure, a MS in a D2D communication system is provided. The MS includes a communication interface configured to perform a data communication with a peer MS using a D2D communication, and to receive feedback information for a retransmission operation for data which is transmitted to the peer MS which is transmitted using a resource block mapped to identification information of a D2D connection from the peer MS, and a controller configured to determine whether there is a need for retransmission of the data based on the feedback information received from the peer MS, and control the first communication interface to retransmit the data to the peer MS if there is a need for the retransmission of the data.

In accordance with another aspect of the present disclosure, a method for performing, by an MS, a retransmission operation in a D2D communication system is provided. The method includes generating a HARQ frame including at least one media access control packet data unit (MAC PDU), generating a mapping table that information on the HARQ frame is mapped to ARQ information of the at least one MAC PDU, transmitting the HARQ frame to a peer MS using a D2D communication, receiving HARQ feedback information indicating whether the HARQ frame is received normally from the peer MS, and updating the mapping table based on the HARQ feedback information.

In accordance with another aspect of the present disclosure, a MS in a D2D communication system is provided. The MS includes a communication interface configured to perform a data communication with a peer MS using a D2D communication, a memory configured to store a mapping table that information on a HARQ frame is mapped to ARQ information of at least one MAC PDU included in the HARQ frame, and a controller configured to control operations of generating the HARQ frame, generating the mapping table, transmitting the HARQ frame to a peer MS using a D2D communication, receiving HARQ feedback information indicating whether the HARQ frame is received normally from the peer MS, and updating the mapping table based on the HARQ feedback information.

In accordance with another aspect of the present disclosure, a method for performing, by an MS, a retransmission operation in a D2D communication system is provided. The method includes performing a data communication with a peer MS using a D2D communication, if transmission of ARQ feedback information has failed, receiving an allocation a resource for transmission of the ARQ feedback information from a base station (BS) included in a cellular communication system, and transmitting the ARQ feedback information to the peer MS through the BS.

In accordance with another aspect of the present disclosure, a MS in a D2D communication system is provided. The MS includes a first communication interface configured to perform a data communication with a peer MS using a D2D communication, a second communication interface configured to perform a data communication with a BS included in a cellular communication system, and a controller configured to control operations of performing the data communication with the peer MS using the D2D communication, receiving an allocation of a resource for transmission of ARQ feedback information from the BS included in the cellular communication system if the transmission of the ARQ feedback information has failed, and transmitting the ARQ feedback information to the peer MS through the BS.

In accordance with another aspect of the present disclosure, a method for performing, by a BS, a retransmission operation in a D2D communication system is provided. The method includes determining whether a HARQ operation is disabled between a transmitting MS and a receiving MS if a D2D connection is established between the transmitting MS and the receiving MS, if the HARQ operation is disabled between the transmitting MS and the receiving MS, allocating a resource for transmitting ARQ feedback information to the receiving MS, receiving the ARQ feedback information from the receiving MS, and transmitting the received ARQ feedback information to the transmitting MS.

In accordance with another aspect of the present disclosure, a BS in a D2D communication system is provided. The BS includes a transmitter/receiver configured to transmit/receive a wireless signal with MSs which use a D2D communication, and a controller configured to control operations of determining whether a HARQ operation is disabled between a transmitting MS and a receiving MS if a D2D connection is established between the transmitting MS and the receiving MS, allocating a resource for transmitting ARQ feedback information to the receiving MS if the HARQ operation is disabled between the transmitting MS and the receiving MS, receiving the ARQ feedback information from the receiving MS, and transmitting the received ARQ feedback information to the transmitting MS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
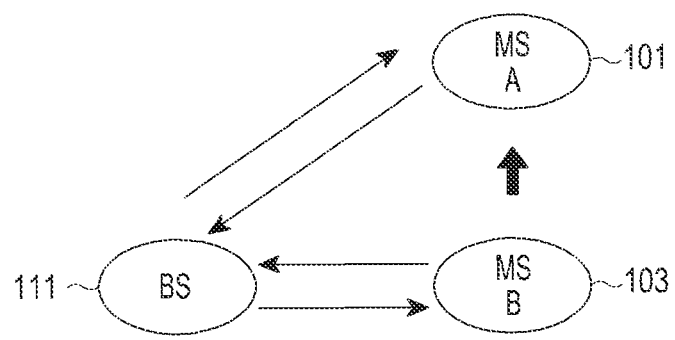
FIG. 1 schematically illustrates a structure of a device to device (D2D) communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

An embodiment of the present disclosure proposes a method and apparatus for performing a retransmission operation in a device to device (D2D) communication system.

An embodiment of the present disclosure proposes a method and apparatus for performing a retransmission operation based on feedback information in a D2D communication system.

An embodiment of the present disclosure proposes a method and apparatus for effectively and stably performing a retransmission operation in a D2D communication system.

An embodiment of the present disclosure proposes a method and apparatus for performing a retransmission operation in a D2D communication system thereby preventing delay upon transmitting feedback information for the retransmission operation.

An embodiment of the present disclosure proposes a method and apparatus for effectively performing transmission of hybrid automatic repeat request (HARQ) feedback information and automatic repeat request (ARQ) feedback information for a retransmission operation.

An embodiment of the present disclosure proposes a method and apparatus for effectively transmitting feedback information for a retransmission operation through a base station (BS) included in a cellular communication system in a D2D communication system.

A method and apparatus proposed in various embodiments of the present disclosure may be applied to various communication systems such as a long term evolution (LTE) system, an LTE-advanced (LTE-A) system, a high speed downlink packet access (HSDPA) mobile communication system, a high speed uplink packet access (HSUPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) mobile communication system, an evolved packet system (EPS), a mobile internet protocol (Mobile IP) system, and the like.

In a D2D communication system, the following techniques are considered if feedback information (e.g., acknowledgement (ACK)/non-acknowledgement (NACK) information, and the like) is transmitted.

First, in a case that a receiving a mobile station (MS) directly transmits feedback information for a retransmission operation to a transmitting MS not through a BS, if the feedback information is regarded as data, a quantity of required control information increases. In this case, the receiving MS may not guarantee time required for transmitting the feedback information, and it is difficult to reuse a space in a D2D communication which uses a wireless local area network (LAN).

Secondly, if the receiving MS transmits the feedback information to the transmitting MS through the BS, the BS should know a state among MSs which use a D2D communication in order to allocate a resource for transmitting data to the transmitting MS. Due to this, delay occurs if a scheduling operation for transmitting the feedback information is performed. Further, if MSs directly allocate resources for transmitting the feedback information, the BS may not know timing points at which the MSs allocate the resources.

An embodiment of the present disclosure proposes a method of effectively transmitting feedback information for a retransmission operation if a plurality of MSs simultaneously perform a transmission operation in a D2D communication. In an embodiment of the present disclosure, it will be assumed that the D2D communication uses a cellular network. For example, if the D2D communication and the cellular network use the same frequency band, the D2D communication which uses the cellular network may be performed using a part of an uplink (UL) band. A BS may perform an operation of allocating a resource for the D2D communication or a D2D MS may directly perform the operation of allocating the resource for the D2D communication.

If initial transmission fails in each D2D connection, a receiving MS transmits feedback information for a retransmission operation to a transmitting MS. A retransmission scheme for the retransmission operation may be one of a hybrid automatic repeat request (HARQ) scheme and an automatic repeat request (ARQ) scheme.

A structure of a D2D communication system according to an embodiment of the present disclosure is described below with reference to FIG. 1.

FIG. 1 schematically illustrates a structure of a D2D communication system according to an embodiment of the present disclosure.

Referring to FIG. 1, it will be assumed that a receiving MS (MS A) 101 and a transmitting MS (MS B) 103 perform a D2D communication using a part of a band included in a UL of a cellular communication system.

The transmitting MS 103 and the receiving MS 101 may transmit/receive data through a D2D connection without using a BS 111. If the data is not normally received in the receiving MS 101, whether to retransmit the data is determined by transmitting feedback information for retransmission (e.g., ACK/NACK information and success/fail information) from the receiving MS 101 to the transmitting MS 103. A method of transmitting the feedback information may be a method of directly transmitting the feedback information through a D2D communication from the receiving MS 101 to the transmitting MS 103, a method of transmitting the feedback information from the receiving MS 101 to the BS111 and transmitting the feedback information from the BS 111 to the transmitting MS 103, and the like.

A structure of a D2D communication system according to an embodiment of the present disclosure has been described with reference to FIG. 1. A process of setting up a D2D connection in an MS in a D2D communication system according to an embodiment of the present disclosure is described below with reference to FIG. 2.

Figure 2:
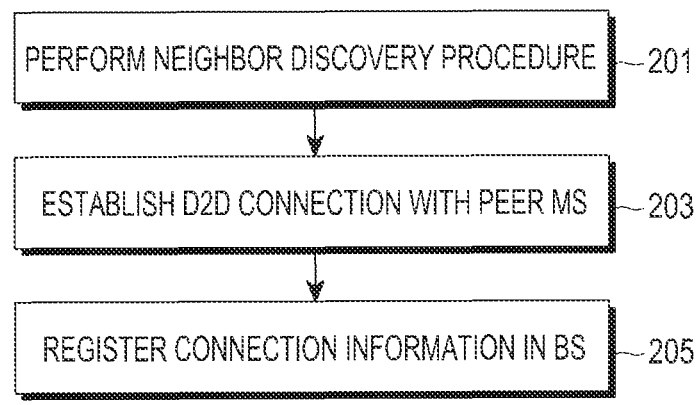
FIG. 2 schematically illustrates a process of setting up a D2D connection in a mobile station (MS) in a D2D communication system according to an embodiment of the present disclosure.

FIG. 2 schematically illustrates a process of setting up a D2D connection in an MS in a D2D communication system according to an embodiment of the present disclosure.

Referring to FIG. 2, an MS which intends to perform a D2D communication recognizes neighbor MSs by performing a neighbor discovery procedure defined in a D2D communication technology at operation 201. The neighbor discovery procedure includes a discovery procedure which uses a BS and a discovery procedure in which an MS directly discovers a neighbor MS. The discovery procedure which uses the BS and the discovery procedure in which the MS directly discovers the neighbor MS will be described below.

In the discovery procedure which uses the BS, the BS broadcasts information on the BS and information on MSs for a D2D communication, and each MS which intends to perform a D2D communication discovers a peer MS for performing the D2D communication by receiving the information broadcast from the BS.

In the discovery procedure in which the MS directly discovers the neighbor MS, each MS broadcasts an identifier (ID) of each MS using a shared resource at specific time, and each MS may discover a peer MS for performing a D2D communication by receiving the information broadcast from each MS.

Each MS which intends to perform the D2D communication establishes a D2D connection for a D2D communication with the peer MS discovered at operation 201 at operation 203. A scheme of establishing the D2D connection includes a scheme of establishing the D2D connection through a BS, a scheme of directly establishing the D2D connection among MSs, and the like. Connection information of each MS for the D2D communication is registered in a BS at operation 205. Each MS for the D2D communication registers connection information with a peer MS in the BS at operation 205.

Although FIG. 2 illustrates a process of setting up a D2D connection in an MS in a D2D communication system according to an embodiment of the present disclosure, various changes could be made to FIG. 2. For example, although shown as a series of operations, various operations in FIG. 2 could overlap, occur in parallel, occur in a different order, or occur multiple times.

A process of setting up a D2D connection in an MS in a D2D communication system according to an embodiment of the present disclosure has been described with reference to FIG. 2. A process of registering connection information in a D2D communication system according to an embodiment of the present disclosure is described below with reference to FIG. 3.

Figure 3:
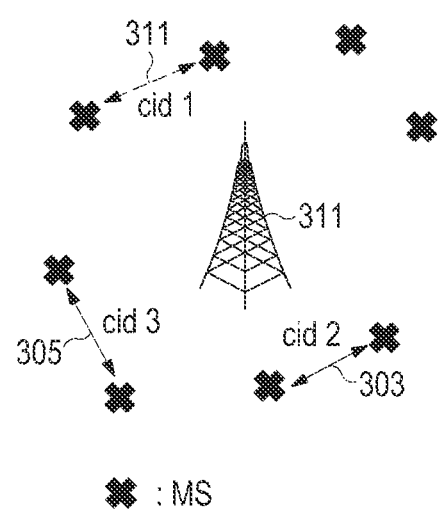
FIG. 3 schematically illustrates a process of registering connection information in a D2D communication system according to an embodiment of the present disclosure.

FIG. 3 schematically illustrates a process of registering connection information in a D2D communication system according to an embodiment of the present disclosure.

Referring to FIG. 3, connection information includes a connection ID (CID) (CID2, CID3) corresponding to each of D2D connections of MSs 303 and 305 and MS information (e.g., an MS ID) corresponding to each CID. In FIG. 3, for example, a resource for a D2D communication is allocated to the CID2 and the CID3 through a distribution scheduling, and a resource for a D2D communication is not allocated to a CID1.

In FIG. 3, a BS 311 registers mapping information that a CID of each D2D connection is mapped to related MS information. If MSs directly establish a D2D connection, a related MS transmits connection information to a BS in an uplink thereby the registration of the connection information is performed. If a D2D connection is established through a BS, the BS may directly register the connection information. According to an embodiment of the present disclosure, the connection information may be managed in a form of table in the BS. If the MS transmits the connection information to the BS and the BS performs a registration operation for the connection information, at least one of a transmitting MS and a receiving MS between which a D2D connection is established may perform transmission of the connection information.

In a D2D communication system according to an embodiment of the present disclosure, a retransmission scheme is classified into an ARQ scheme and an HARQ scheme, and the HARQ scheme may be optionally performed. If the HARQ scheme is set to "ENABLE" or "ON", in a retransmission procedure, a HARQ procedure is firstly performed, and, if the HARQ procedure fails, an ARQ procedure is performed. On the other hand, if the HARQ scheme is set to "DISABLE" or "OFF", the HARQ procedure is not performed, and the ARQ procedure is performed.

For performing the HARQ procedure and the ARQ procedure, a receiving MS transmits feedback information for a retransmission operation to a transmitting MS. The feedback information is classified into HARQ feedback information and ARQ feedback information. The feedback information indicates ACK/NACK information or success/fail information for data transmitted from the transmitting MS to the receiving MS. The receiving MS may transmit the feedback information on a remaining resource after transmission of data by applying a predetermined level of energy to each resource block (RB). On the other hand, the feedback information may be a predetermined value.

According to another embodiment of the present disclosure, various coding schemes or various modulation schemes may be applied to the transmission of the feedback information.

Upon detecting the predetermined level of energy or the predetermined value from received feedback information, the transmitting MS may determine that data (re)transmission is successful or failed. If the data (re)transmission failed, the transmitting MS performs an HARQ operation or an ARQ operation within a predetermined number.

According to an embodiment of the present disclosure, if a transmission scheme used in a D2D communication is an orthogonal frequency division multiplexing (OFDM) transmission scheme, each RB mapped to each CID is allocated across at least one tone in a frequency domain and at least one symbol interval in a time domain.

An example of an HARQ procedure in a D2D communication system according to an embodiment of the present disclosure is described below with reference to FIG. 4.

Figure 4:
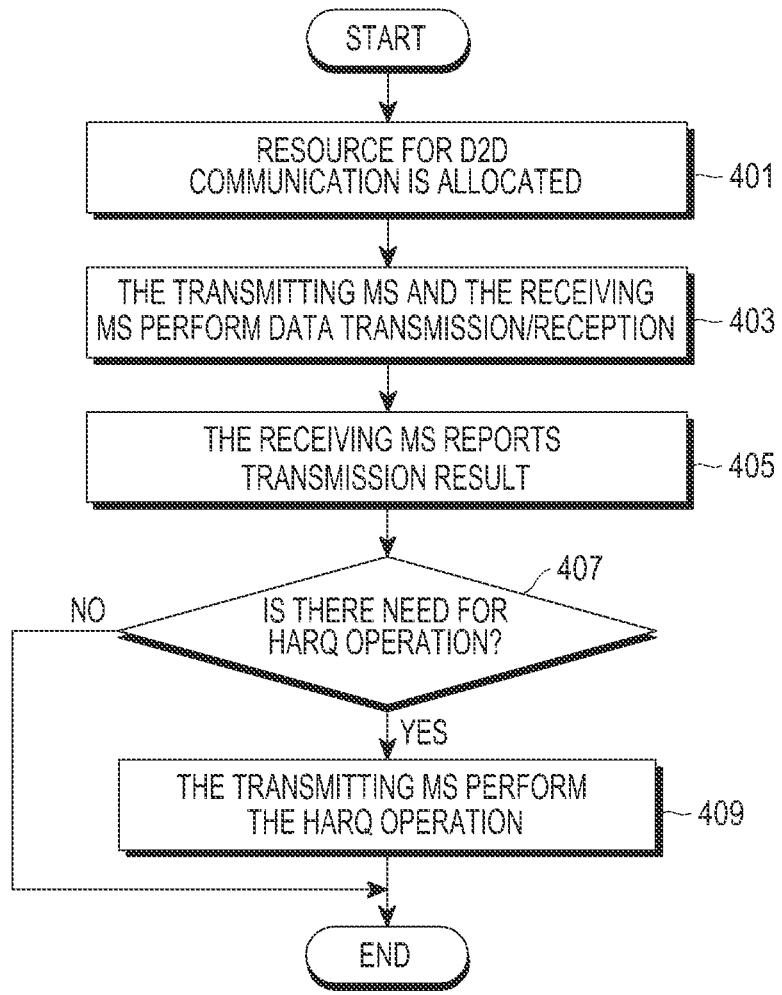
FIG. 4 schematically illustrates an example of a hybrid automatic repeat request (HARQ) procedure in a D2D communication system according to an embodiment of the present disclosure.

FIG. 4 schematically illustrates an example of an HARQ procedure in a D2D communication system according to an embodiment of the present disclosure.

Referring to FIG. 4, a resource for a D2D communication is allocated to a transmitting MS and a receiving MS through a discovery and connection process at operation 401. The resource is mapped to a CID between the transmitting MS and the receiving MS, and a BS maps MS information of related MSs to a CID to register the mapped result as connection information. The transmitting MS and the receiving MS perform a data transmission/reception operation using the allocated resource at operation 403. The receiving MS reports a transmission result for received data using a RB mapped to a CID at operation 405. It will be understood that the transmission result is feedback information for a retransmission operation including ACK/NACK information for data transmitted from the transmitting MS to the receiving MS through the D2D communication.

The transmitting MS determines whether there is a need for an HARQ operation for a related data based on the transmission result received at operation 405 at operation 407. For example, if the transmission result indicates ACK information, the transmitting MS determines that there is no need for the HARQ operation, and if the transmission result indicates NACK information, the transmitting MS determines that there is a need for the HARQ operation. If there is a need for the HARQ operation, the transmitting MS performs an HARQ operation for the receiving MS at operation 409.

If there is no need for the HARQ operation, the transmitting MS does not perform the HARQ operation and ends the process.

Although FIG. 4 illustrates an example of an HARQ procedure in a D2D communication system according to an embodiment of the present disclosure, various changes could be made to FIG. 4. For example, although shown as a series of operations, various operations in FIG. 4 could overlap, occur in parallel, occur in a different order, or occur multiple times.

An example of an HARQ procedure in a D2D communication system according to an embodiment of the present disclosure has been described with reference to FIG. 4 has been described with reference to FIG. 4. An example of transmitting HARQ feedback information in a D2D communication system according to an embodiment of the present disclosure is described below with reference to FIG. 5.

Figure 5:
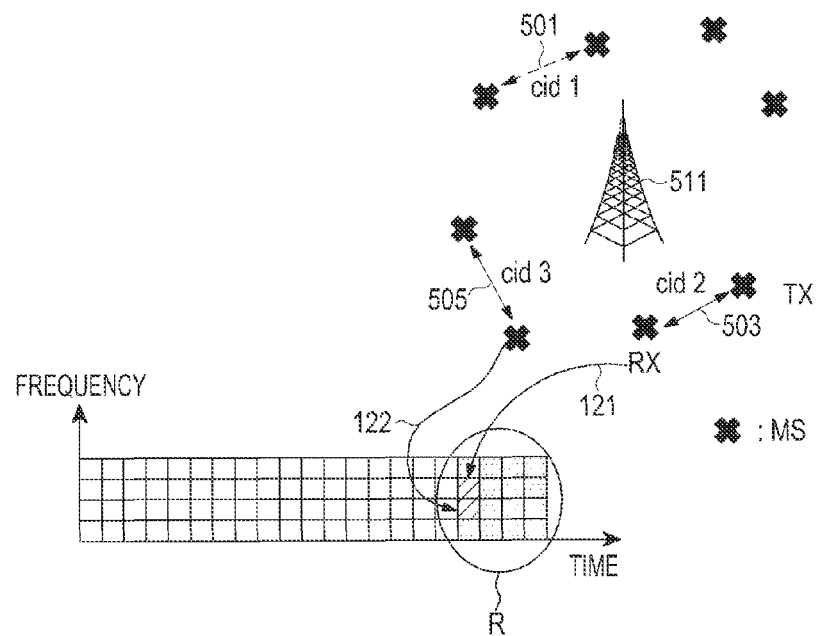
FIG. 5 schematically illustrates an example of transmitting HARQ feedback information in a D2D communication system according to an embodiment of the present disclosure.

FIG. 5 schematically illustrates an example of transmitting HARQ feedback information in a D2D communication system according to an embodiment of the present disclosure.

Referring to FIG. 5, it will be assumed that a resource for a D2D communication is not allocated to a CID1 501, and the resource for the D2D communication is allocated to a CID2 503 and a CID3 505. A resource Region (R) for transmission of HARQ feedback information may be allocated as a resource region which is allocated separately from a resource region for transmission of data, or a remaining resource which is not used for the transmission of the data. For example, a RB for the transmission of the HARQ operation is separately mapped to each CID. 121 indicates a RB mapped to the CID2 503, and 122 indicates a RB mapped to the CID3 505.

Referring to FIG. 4, if the transmitting MS receives the HARQ feedback information and determines that there is need for the HARQ operation, the transmitting MS retransmits a related data to the receiving MS at operation 409. The data retransmission is performed within a predetermined number as illustrated in FIG. 6.

Figure 6:
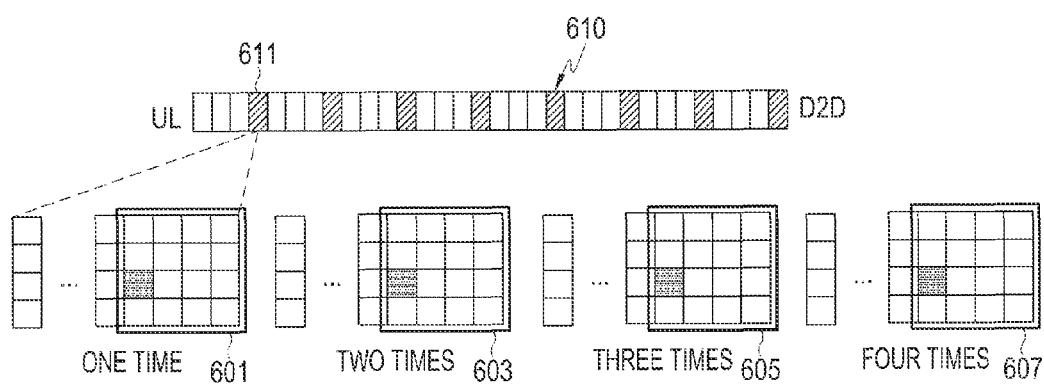
FIG. 6 schematically illustrates a HARQ operation in a D2D communication system according to an embodiment of the present disclosure.

FIG. 6 schematically illustrates an HARQ operation in a D2D communication system according to an embodiment of the present disclosure.

Referring to FIG. 6, a case that a maximum data (re) transmission number is 4 is illustrated as 601, 603, 605, and 607. If an HARQ operation is successful in the first transmission 601, the second transmission 603, or the third transmission 605, a retransmission operation is omitted.

It will be understood that the first transmission 601 is initial transmission, and the second transmission 603 and transmission after the second transmission 605, 607 are retransmission. For example, the HARQ operation may be performed using a part of a resource 611 (illustrated as a hatching in FIG. 6) in an uplink frequency band 610 in a cellular communication system.

Even though an example of allocating a resource for an HARQ operation is illustrated in FIG. 6, however, it will be understood by those of ordinary skill in the art that an operation of allocating a resource for the HARQ operation may be performed by various resource allocation schemes known in a D2D communication.

If the determining result indicates that there is no need for the HARQ operation at operation 407, the transmitting MS determines that the receiving MS successfully receives data, so the transmitting MS transmits the next data or ends a data transmission operation.

A HARQ operation in a D2D communication system according to an embodiment of the present disclosure has been described with reference to FIG. 6, and a process of mapping an HARQ operation to an ARQ operation in a D2D communication system according to an embodiment of the present disclosure will be described with reference to FIG. 7.

Figure 7:
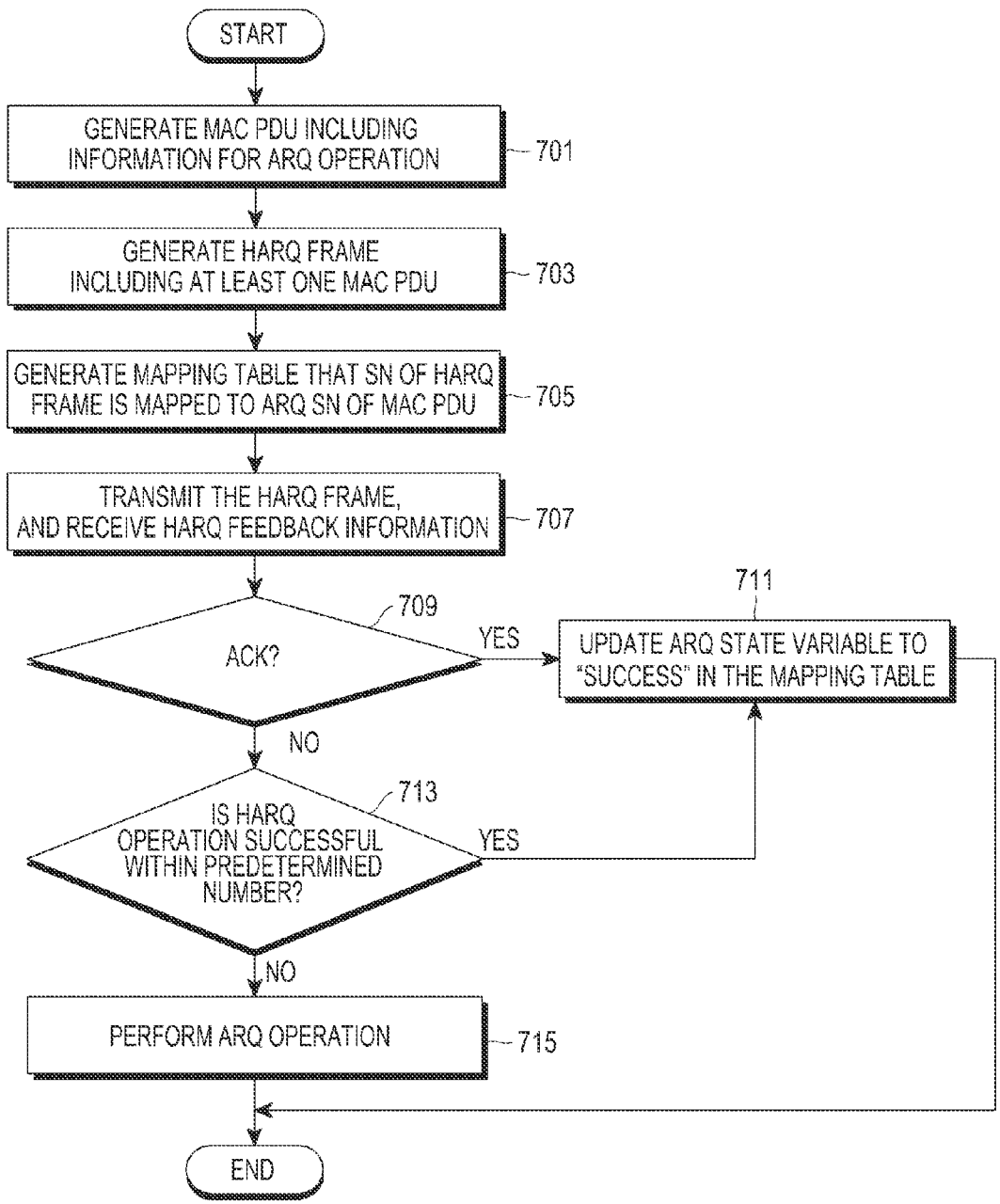
FIG. 7 schematically illustrates a process of mapping a HARQ operation to an automatic repeat request (ARQ) operation in a D2D communication system according to an embodiment of the present disclosure.

FIG. 7 schematically illustrates a process of mapping an HARQ operation to an ARQ operation in a D2D communication system according to an embodiment of the present disclosure.

Referring to FIG. 7, a process of mapping an HARQ operation to an ARQ operation indicates a process of mapping an HARQ operation to an ARQ operation in a case that a D2D communication system supports an HARQ scheme and an ARQ scheme.

A transmitting MS generates a media access control packet data unit (MAC PDU) including information for an ARQ operation in a case that an HARQ operation for a receiving MS is performed at operation 701. The transmitting MS generates an HARQ frame including at least one MAC PDU at operation 703. The information for the ARQ operation includes a sequence number (SN), a segment sequence number (SSN) for the ARQ operation, and the like.

One ARQ SN for an ARQ operation is allocated to one MAC PDU. If the MAC PDU is a fragmented MAC PDU which is located at the last part in a payload included in an HARQ frame, the fragmented MAC PDU includes the ARQ SN for the ARQ operation along with an ARQ SSN which corresponds to the fragmented MAC PDU. This is why a plurality of MAC PDUs may be concatenated to one MAC frame. For example, if an HARQ frame includes three concatenated MAC PDUs and the last MAC PDU among the three concatenated MAC PDUs (i.e., the third MAC PDU is a fragmented MAC PDU), the first MAC PDU may include ARQ SN1 as information for an ARQ operation, the second MAC PDU may include ARQ SN2 as the information for the ARQ operation, and the third MAC PDU as a fragmented MAC PDU may include ARQ SN3 and ARQ SSN1 indicating the first fragment as the information for the ARQ operation. Further, the HARQ frame may include an SN indicating a frame number at operation 703.

The transmitting MS generates a mapping table that an SN of an HARQ frame is mapped to an ARQ SN of a MAC PDU included in the HARQ frame before transmitting the HARQ frame at operation 705. The transmitting MS transmits the HARQ frame to the receiving MS, and receives HARQ feedback information indicating whether the HARQ frame is normally received as a response to the HARQ frame transmission from the receiving MS at operation 707. The transmitting MS determines whether the HARQ feedback information indicates ACK information at operation 709. As described above, the HARQ feedback information may be transmitted by a predetermined level of energy or with a form of a predetermined value.

If the HARQ frame is successfully transmitted, that is, the HARQ feedback information indicates ACK (or success) information, the transmitting MS updates an ARQ state variable to "success" in the mapping table at operation 705 and ends an HARQ operation. In this case, an operation ARQ operation is not performed.

If the HARQ feedback information indicates NACK (or fail) information not ACK (or success) information, the transmitting MS determines that the HARQ operation has failed and proceeds to operation 713 and repetitively performs a predetermined number of HARQ operations.

If the HARQ operation is successful within the predetermined number of HARQ operations, the transmitting MS proceeds to operation 711 and updates the ARQ state variable to "success" in the mapping table. If the HARQ operation fails, the transmitting MS proceeds to operation 715 and performs an ARQ operation (i.e., a retransmission operation according to an ARQ scheme).

Table 1 indicates an example of a mapping table which the transmitting MS generates and updates according to an embodiment of the present disclosure in FIG. 7.

TABLE 1

| HARQ frame SN | ARQ SN | HARQ retry number | ARQ state variable |
|---|---|---|---|
| 1 | 1, 2, 3-1 | 2 | success |

The mapping table in Table 1 is a mapping table that is generated if a HARQ includes two MAC PDUs and one fragmented MAC PDU. It may be known that an SN of the HARQ frame is "1", ARQ SNs are "1" and "2", respectively, an ARQ SN-ARQ SSN of the fragmented MAC PDU is "3-1", and data transmission at the second HARQ operation has been successful.

The receiving MS generates and manages the same mapping table. That is, if the HARQ frame is successfully received, the receiving MS updates the ARQ state variable to "success".

Although FIG. 7 illustrates a process of mapping a HARQ operation to an ARQ operation in a D2D communication system according to an embodiment of the present disclosure, various changes could be made to FIG. 7. For example, although shown as a series of operations, various operations in FIG. 7 could overlap, occur in parallel, occur in a different order, or occur multiple times.

A process of mapping a HARQ operation to an ARQ operation in a D2D communication system according to an embodiment of the present disclosure has been described with reference to FIG. 7, and a process of transmitting feedback information for an ARQ operation in a D2D communication system according to an embodiment of the present disclosure.

Figure 8:
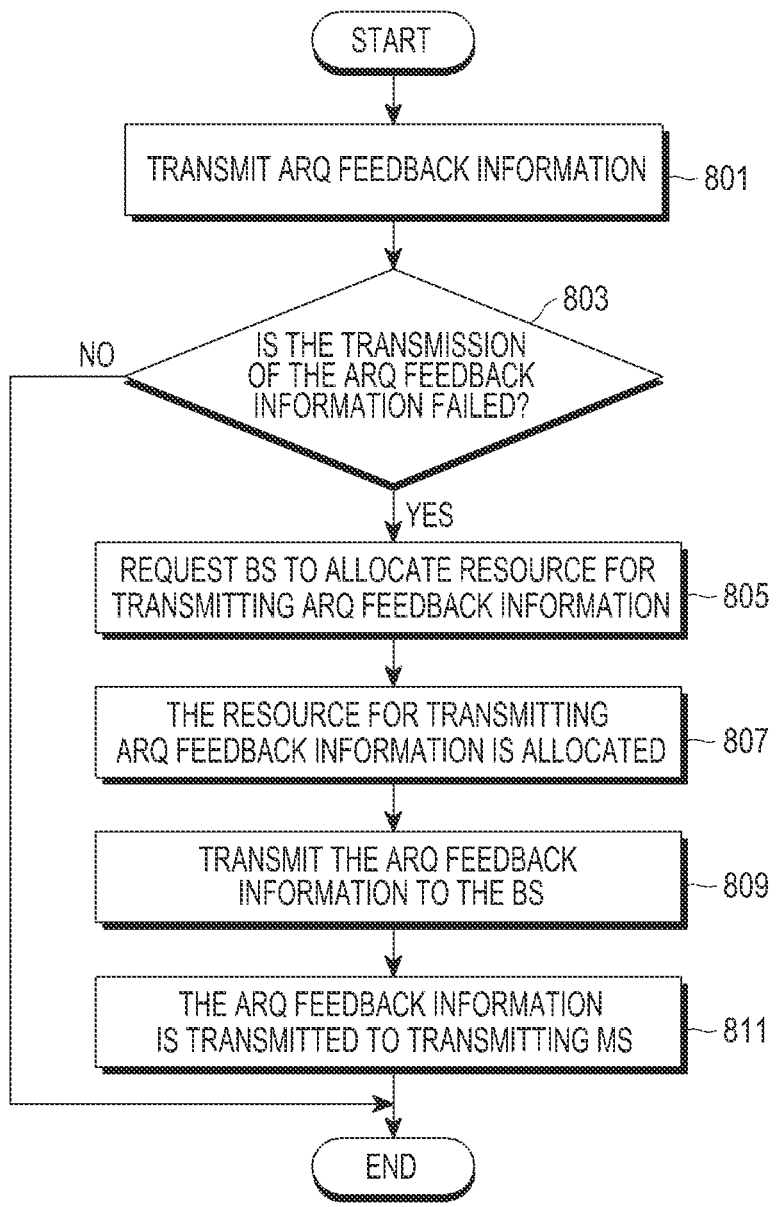
FIG. 8 schematically illustrates a process of transmitting feedback information for an ARQ operation in a D2D communication system according to an embodiment of the present disclosure.

FIG. 8 schematically illustrates a process of transmitting feedback information for an ARQ operation in a D2D communication system according to an embodiment of the present disclosure.

Referring to FIG. 8, a process of transmitting feedback information for an ARQ operation may be performed at an ARQ operation at operation 715 or when an HARQ operation is off and there is a need for an ARQ operation.

Even though not illustrated in FIG. 8, if an ARQ operation is performed, a transmitting MS transmits data to a receiving MS during an ARQ window, and receives ARQ feedback information for the ARQ operation in response to the data transmission from the receiving MS within an ARQ retry timeout. It will be noted that the process of transmitting the feedback information for the ARQ operation in FIG. 8 is a process of transmitting ARQ feedback information performed in the receiving MS.

If HARQ retransmission fails, or HARQ retransmission is disabled (or off) and a receiving MS transmits a response for whether there is a need for data retransmission to a transmitting MS, the receiving MS transmits ARQ feedback information to the transmitting MS within a predetermined number through a D2D communication at operation 801.

The receiving MS determines whether the transmission of the ARQ feedback information has failed through the D2D communication within the predetermined number at operation 803. If the transmission of the ARQ feedback information has failed, the receiving MS requests a BS to allocate a resource for transmitting ARQ feedback information at operation 805. The receiving MS is allocated the resource for transmitting the ARQ feedback information from the BS at operation 807, and transmits the ARQ feedback information to the BS using the allocated resource at operation 809. The ARQ feedback information is transmitted to the transmitting MS through the BS at operation 811. If the transmission of the ARQ feedback information using the D2D communication is successful at operation 803, or the transmission of the ARQ feedback information is performed through the BS at operation 811, the transmitting MS performs an ARQ operation to the receiving MS in a case that retransmission is necessary according to related ARQ feedback information.

Although FIG. 8 illustrates a process of transmitting feedback information for an ARQ operation in a D2D communication system according to an embodiment of the present disclosure, various changes could be made to the process shown in FIG. 8. For example, although shown as a series of operations, various operations in FIG. 8 could overlap, occur in parallel, occur in a different order, or occur multiple times.

A process of transmitting feedback information for an ARQ operation in a D2D communication system according to an embodiment of the present disclosure has been described with reference to FIG. 8. A state according to a process of transmitting feedback information for an ARQ operation in a D2D communication system according to an embodiment of the present disclosure is described below with reference to FIG. 9.

Figure 9:
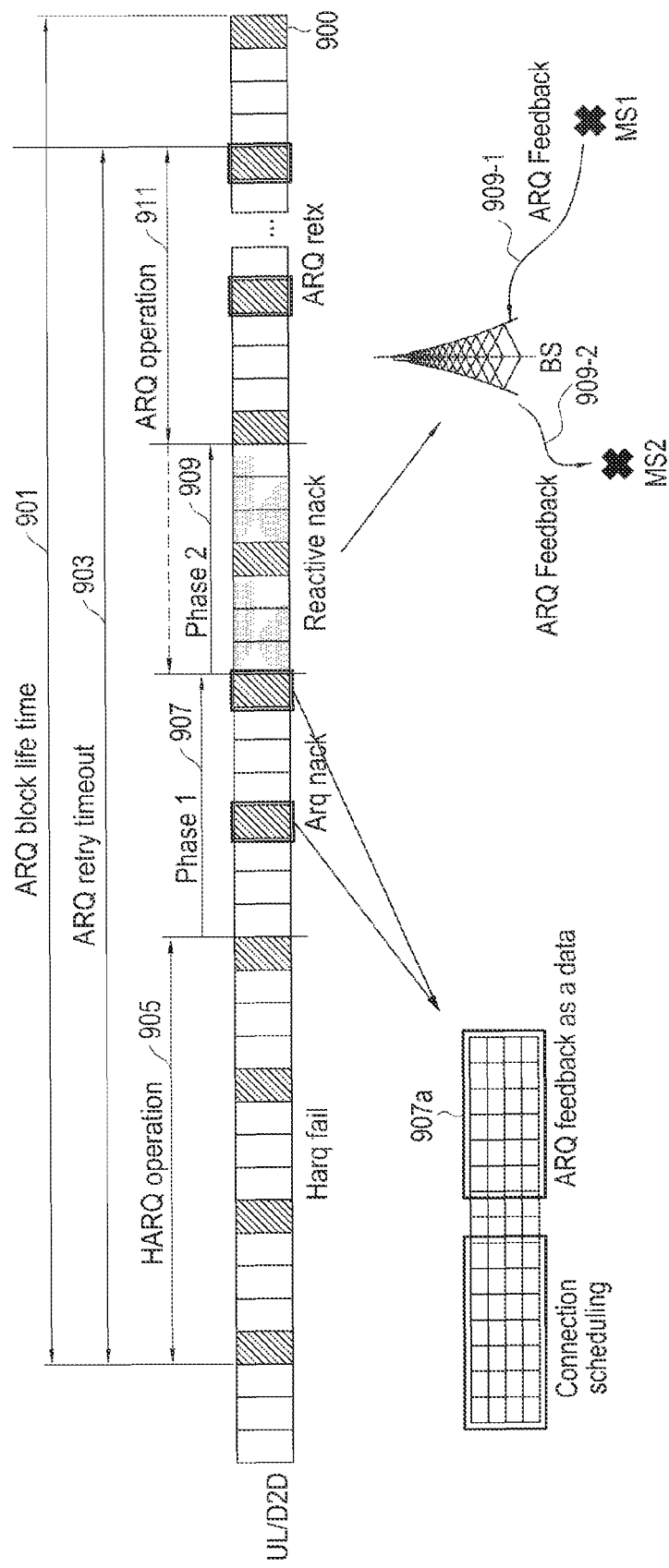
FIG. 9 schematically illustrates a state according to a process of transmitting feedback information for an ARQ operation in a D2D communication system according to an embodiment of the present disclosure.

FIG. 9 schematically illustrates a state according to a process of transmitting feedback information for an ARQ operation in a D2D communication system according to an embodiment of the present disclosure.

Referring to FIG. 9, a state according to a process of transmitting feedback information for an ARQ operation in FIG. 9 is a state according to a process of transmitting feedback information for an ARQ operation in FIG. 8.

A HARQ operation and an ARQ operation may be performed using a UL frequency band 900 of a cellular communication system. Even though an example of allocating a UL frequency band is illustrated in FIG. 9, however, it will be understood by those of ordinary skill in the art that an operation of allocating a UL frequency band may be performed by various resource allocation schemes known in a D2D communication.

It will be assumed that there the process of transmitting the feedback information for the ARQ operation includes an ARQ block life time 901 and an ARQ retry timeout 903 for ARQ block transmission. As described in the process of transmitting the feedback information for the ARQ operation in FIG. 8, in the process of transmitting the feedback information for the ARQ operation in FIG. 9, it will be assumed that a HARQ operation 905 has failed, and transmission of feedback information for an ARQ operation (e.g., ARQ NACK information) is required.

The process of transmitting the ARQ feedback information in FIG. 9 may include Phase 1 907 and Phase 2 909. In the Phase 1 907, a receiving MS MS1 transmits ARQ feedback information 907a as data using a D2D communication. If the transmission of the ARQ feedback information 907a fails, in the Phase 2 909, the receiving MS MS1 transmits ARQ feedback information to a BS in operation 909-1, and the BS transmits the ARQ feedback information to the transmitting MS MS2 after receiving the ARQ feedback information in operation 909-2. After receiving the ARQ feedback information, the transmitting MS MS2 performs an ARQ operation for the receiving MS MS1 in operation 911. If transmission of an ARQ block fails after the ARQ block life time 901 has passed, the BS may conclude that the HARQ operation is disabled and perform only ARQ operation.

According to an embodiment of the present disclosure, a scheme of transmitting ARQ feedback information for an ARQ operation in a case that an HARQ operation is performed in a D2D communication and a scheme of transmitting ARQ feedback information for an ARQ operation in a case that an HARQ operation is not performed in a D2D communication may be performed separately.

The scheme of transmitting the ARQ feedback information for the ARQ operation in the case that the HARQ operation is performed in the D2D communication is described below.

If a receiving MS uses an HARQ scheme, the receiving MS may transmit HARQ feedback information to a transmitting MS in each frame through a D2D communication whenever an HARQ operation is failed. A BS listens for HARQ feedback information which is transmitted in each frame, and counts a number of HARQ operation performed within a predetermined number. If all HARQ operations which are performed within the predetermined number fail, the BS may allocate a communication resource for transmitting ARQ feedback information to the receiving MS.

A scheme of transmitting ARQ feedback information for an ARQ operation in a case that an HARQ operation is not performed in a D2D communication system according to an embodiment of the present disclosure is described below with reference to FIG. 10.

Figure 10:
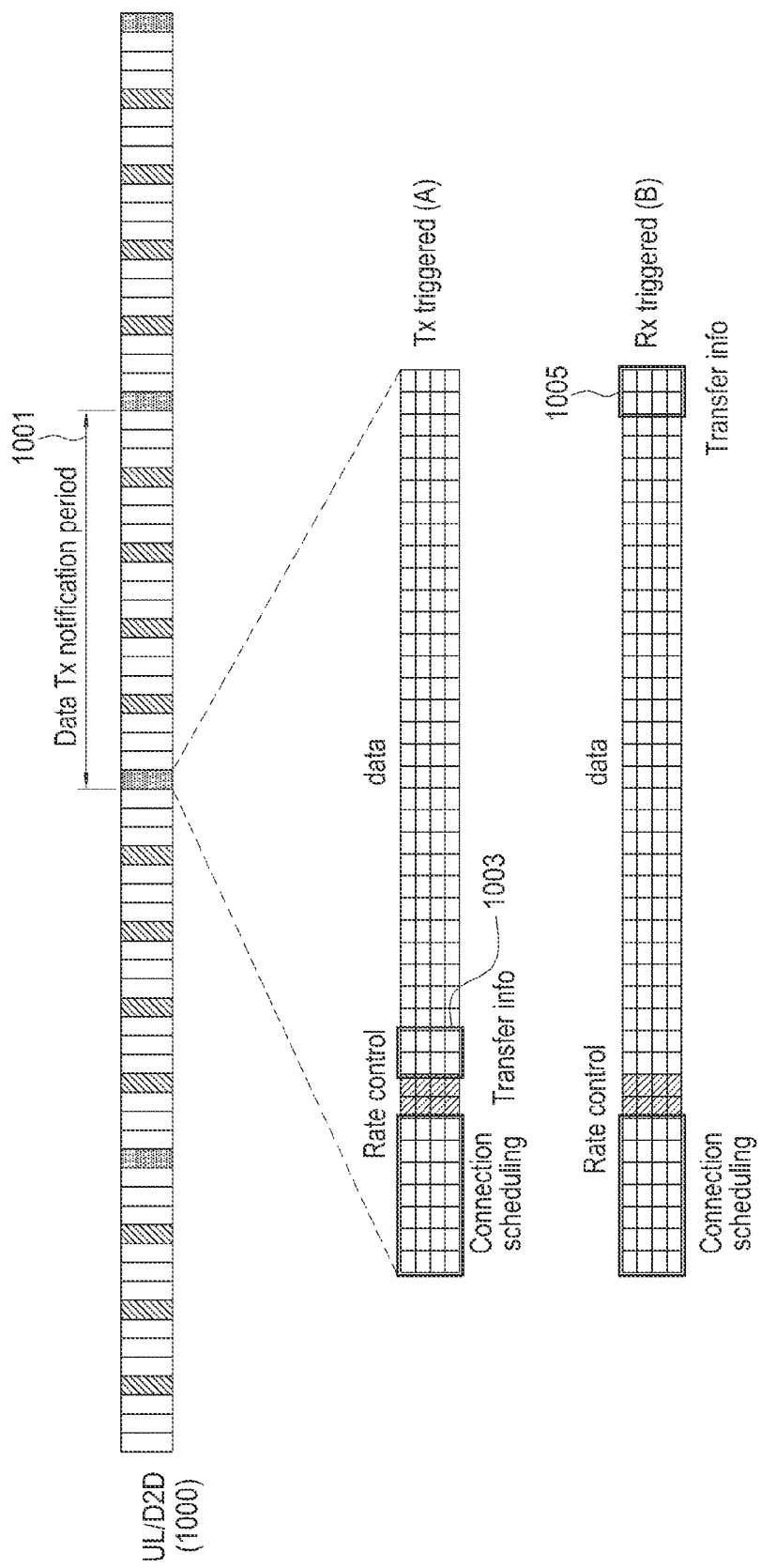
FIG. 10 schematically illustrates transmission information indicating that a HARQ operation is not performed in a D2D communication system according to an embodiment of the present disclosure.

FIG. 10 schematically illustrates transmission information indicating that an HARQ operation is not performed in a D2D communication system according to an embodiment of the present disclosure.

Referring to FIG. 10, according to an embodiment of the present disclosure, if an HARQ operation is not performed, a receiving MS or a transmitting MS may transmit transmission information indicating that the receiving MS or the transmitting MS does not perform the HARQ operation to a BS during a predetermined interval in each frame upon periodically transmitting data (data Tx notification period 1001).

Transmission information 1003, 1005 may be transmitted using a UL frequency band 1000 of a cellular communication system. In FIG. 10, (A) indicates an example that the transmitting MS transmits the transmission information 1003 in a payload in each frame, and (B) indicates an example that the receiving MS transmits the transmission information 1005 in the payload in each frame. Locations of the transmission information 1003, 1005 are just an example; it will be understood by those of ordinary skill in the art that the transmission information 1003, 1005 may be transmitted at various locations within a frame which is predetermined between an MS and a BS.

Transmission information indicating that a HARQ operation is not performed in a D2D communication system according to an embodiment of the present disclosure has been described with reference to FIG. 10. A process of transmitting ARQ feedback information according to whether an HARQ operation is disabled in a D2D communication system according to an embodiment of the present disclosure is described below with reference to FIG. 11.

Figure 11:
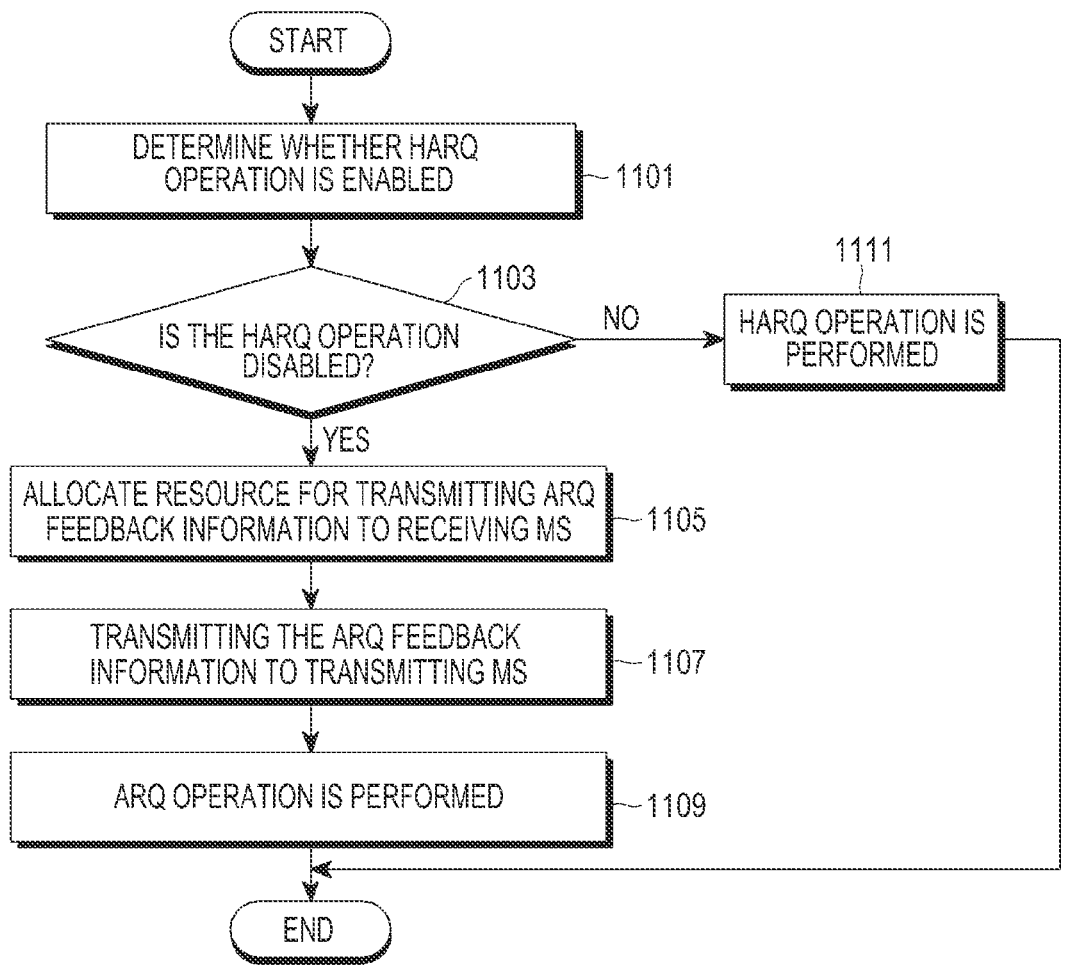
FIG. 11 schematically illustrates a process of transmitting ARQ feedback information according to whether an HARQ operation is disabled in a D2D communication system according to an embodiment of the present disclosure.

FIG. 11 schematically illustrates a process of transmitting ARQ feedback information according to whether an HARQ operation is disabled in a D2D communication system according to an embodiment of the present disclosure.

Referring to FIG. 11, a BS determines whether an HARQ operation is enabled at operation 1101. The BS may listen for HARQ feedback information transmitted from a receiving MS to a transmitting MS if an HARQ operation is enabled, or receives transmission information 1003, 1005 indicating that the HARQ operation is disabled from the transmitting MS or the receiving MS as described in FIG. 10 if the HARQ operation is disabled. For this, the BS may perform an operation of registering connection information as described in FIG. 2 before operation 1101.

The BS determines whether the HARQ operation is disabled at operation 1103. If the HARQ operation is enabled, the BS listens for HARQ feedback information, counts a number of HARQ operation failures, and in operation 1105 allocates a resource for transmitting ARQ feedback information to a receiving MS if the number of the HARQ operation failures is equal to a predetermined number, or the BS recognizes that the HARQ operation is disabled by receiving transmission information as described in FIG. 10. The BS receives ARQ feedback information from the receiving MS through the allocated resource, and transmits the received ARQ feedback information to the transmitting MS at operation 1107. An ARQ operation is performed between the transmitting MS and the receiving MS using a D2D communication at operation 1109. If the HARQ operation is enabled, an HARQ operation is performed between the transmitting MS and the receiving MS using a D2D communication at operation 1111.

A process of transmitting ARQ feedback information according to whether an HARQ operation is disabled in a D2D communication system according to an embodiment of the present disclosure has been described with reference to FIG. 11. A state according to a process of transmitting ARQ feedback information according to whether an HARQ operation is disabled in a D2D communication system according to an embodiment of the present disclosure is described below with reference to FIG. 12.

Figure 12:
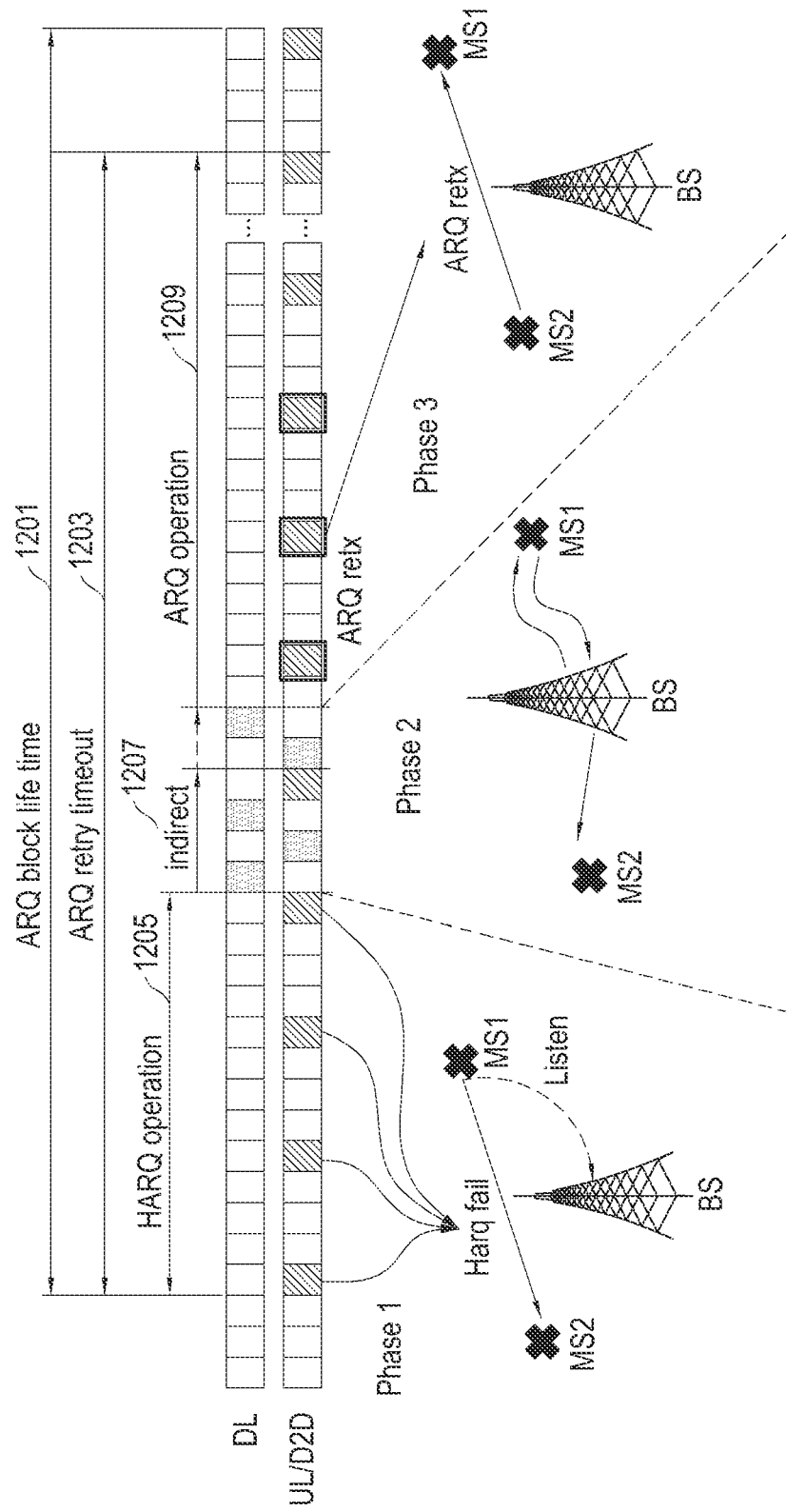
FIG. 12 schematically illustrates a state according to a process of transmitting ARQ feedback information according to whether an HARQ operation is disabled in a D2D communication system according to an embodiment of the present disclosure.

FIG. 12 schematically illustrates a state according to a process of transmitting ARQ feedback information according to whether an HARQ operation is disabled in a D2D communication system according to an embodiment of the present disclosure.

Referring to FIG. 12, a state according to a process of transmitting ARQ feedback information according to whether an HARQ operation is disabled in FIG. 12 is a state according to a process of transmitting ARQ feedback information according to whether an HARQ operation is disabled in FIG. 11.

An HARQ operation and an ARQ operation may be performed using a UL frequency band in a cellular communication system. Allocation of a UL frequency band in FIG. 12 is just an example; it will be understood by those of ordinary skill in the art that the allocation of the UL frequency band may be performed based on various resource allocation schemes known in a D2D communication.

The process of transmitting the ARQ feedback information according to whether the HARQ operation is disabled includes an ARQ block life time 1201 and an ARQ retry timeout 1203 for ARQ block transmission in. It will be noted that the process of transmitting the ARQ feedback information according to whether the HARQ operation is disabled is a process of transmitting the ARQ feedback information according to whether the HARQ operation is disabled in a case that an HARQ operation 1205 is failed and disabled, and transmission of ARQ feedback information (e.g., ARQ NACK information) is required.

The process of transmitting the ARQ feedback information according to whether the HARQ operation is disabled in FIG. 12 includes Phase 1 1205 in which an HARQ operation is performed, Phase 2 1207 in which transmission of ARQ feedback information is performed, and Phase 3 1209 in which an ARQ operation is performed.

In the Phase 1 1205, a BS listens for HARQ feedback information transmitted from a receiving MS MS1 to a transmitting MS MS2, or receives transmission information 1003, 1005 transmitted from the transmitting MS MS2 or the receiving MS MS1 to determine whether an HARQ operation is disabled. If the HARQ operation is disabled, the BS allocates a resource for transmitting ARQ feedback information to the receiving MS MS1, receives the ARQ feedback information from the receiving MS MS1, and transmits the ARQ feedback information to the transmitting MS MS2 in the Phase 2 1207. In the Phase 3 1209, an ARQ operation using a D2D communication is performed between the transmitting MS MS2 and the receiving MS MS1.

A state according to a process of transmitting ARQ feedback information according to whether an HARQ operation is disabled in a D2D communication system according to an embodiment of the present disclosure has been described with reference to FIG. 12. An inner structure of an MS in a D2D communication system according to an embodiment of the present disclosure will be described with reference to FIG. 13.

Figure 13:
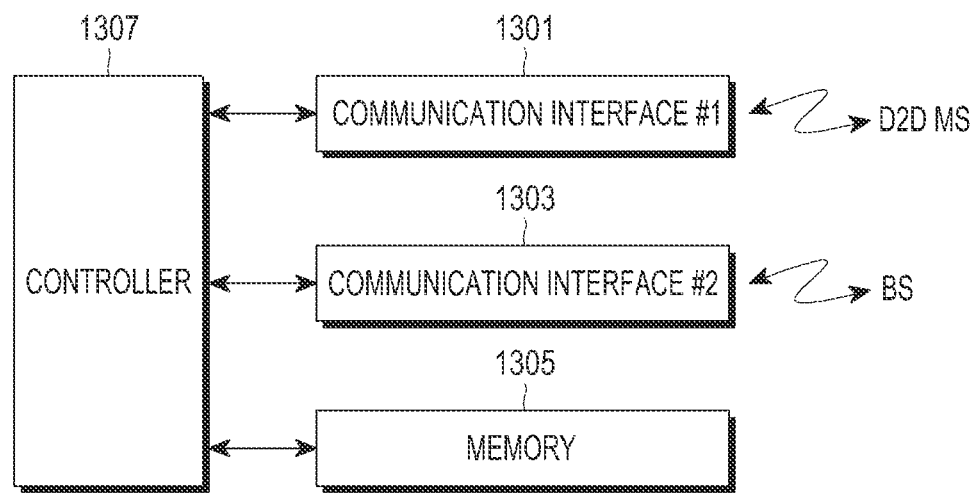
FIG. 13 schematically illustrates an inner structure of an MS in a D2D communication system according to an embodiment of the present disclosure.

FIG. 13 schematically illustrates an inner structure of an MS in a D2D communication system according to an embodiment of the present disclosure.

Referring to FIG. 13, an MS includes a communication interface #1 1301 for performing a data communication with a peer MS using a D2D communication, a communication interface #2 1303 for performing a data communication with BS included in a cellular communication system, a memory 1305 for storing a mapping table in FIG. 7, and a controller for controlling an operation of transmitting/receiving and retransmitting HARQ feedback information and ARQ feedback information according to a retransmission method in a D2D communication system in FIGS. 1 to 12. The operation of transmitting/receiving and retransmitting the HARQ feedback information and the ARQ feedback information according to the retransmission method in the D2D communication system is performed in the manner described with reference to FIGS. 1 to 12 and a description thereof will be omitted herein. The memory 1305 may be optionally included in the MS.

While the communication interface #1 1301, the communication interface #2 1303, the memory 1305, and the controller 1307 are shown in FIG. 13 as separate units, it is to be understood that this is merely for convenience of description. In other words, two or more of the communication interface #1 1301, the communication interface #2 1303, the memory 1305, and the controller 1307 may be incorporated into a single unit.

According to an embodiment of the present disclosure, although not shown in any FIG., a BS may include a transmitter/receiver for performing a data communication with MSs which use a D2D communication, and a controller for registering and managing connection information of D2D MSs, and supporting transmission/reception of feedback information for an HARQ operation and an ARQ operation among the D2D MSs according to a retransmission method in FIGS. 1 to 12.

While the transmitter/receiver and the controller may be implemented as separate units, it is to be understood that the transmitter/receiver and the controller may be incorporated into a single unit.

According to an embodiment of the present disclosure, transmission of HARQ feedback information and ARQ feedback information may be performed without delay in a D2D communication, and the ARQ feedback information may be effectively performed according to whether an HARQ operation is disabled.

Certain aspects of the present disclosure may also be embodied as computer readable code on a computer readable recording medium. A computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable read only memory (ROM), a memory, for example, a random access memory (RAM, a memory chip, a memory device, or a memory integrated circuit (IC), or an optically or magnetically recordable non-transitory machine-readable, e.g., computer-readable, storage medium, e.g., a compact disk (CD), a digital versatile disk (DVD), a magnetic disk, or a magnetic tape. A method and apparatus according to an embodiment of the present disclosure may be implemented by a computer or a mobile terminal that includes a controller and a memory, and the memory may be an example of a non-transitory machine-readable, e.g., computer-readable, storage medium suitable to store a program or programs including instructions for implementing various embodiments of the present disclosure.

The present disclosure may include a program including code for implementing the apparatus and method as defined by the appended claims, and a non-transitory machine-readable, e.g., computer-readable, storage medium storing the program.

An apparatus according to an embodiment of the present disclosure may receive the program from a program providing device which is connected to the apparatus via a wire or a wireless and store the program. The program providing device may include a memory for storing instructions which instruct to perform a contents protect method which has been already installed, information necessary for the contents protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing, by a mobile station (MS), a retransmission operation in a device to device (D2D) communication system, the method comprising:
    performing a data communication with a peer MS using a D2D communication;
    receiving a resource block mapped to identification information related to a data retransmission between the MS and the peer MS from a base station;
    receiving feedback information for a retransmission operation for data, which is transmitted to the peer MS, which is transmitted using the resource block mapped to the identification information between the MS and the peer MS of a D2D connection from the peer MS;
    determining whether there is a need for retransmission of the data based on the feedback information received from the peer MS; and
    retransmitting, if there is a need for the retransmission of the data, retransmission data to the peer MS,
    wherein the retransmission data is retransmitted based on a hybrid automatic repeat request (HARQ) scheme,
    wherein the retransmission data is retransmitted based on an automatic repeat request (ARQ) scheme if data retransmission based on the HARQ scheme fails, and
    wherein the identification information of the D2D connection between the MS and the peer MS is managed by the base station as a D2D connection information related to the MS and the peer MS.

2. The method of claim 1, wherein the feedback information includes feedback information for the HARQ scheme.

3. The method of claim 1, wherein the feedback information is transmitted using a preset level of energy, or set to a preset value.

4. The method of claim 1, wherein the identification information of the D2D connection includes a connection identifier (CID) of the D2D connection.

5. The method of claim 4, wherein MS information corresponding to the CID and connection information including the CID are registered in a base station (BS).

6. The method of claim 1, wherein the retransmitting of the retransmission data to the peer MS comprises:
    generating a HARQ frame including at least one media access control packet data unit (MAC PDU);
    generating a mapping table, where information on the HARQ frame is mapped to ARQ information of the at least one MAC PDU; and
    transmitting the HARQ frame to the peer MS using the D2D communication.

7. The method of claim 6, further comprising:
    receiving HARQ feedback information indicating whether the HARQ frame is received normally from the peer MS; and
    updating the mapping table based on the HARQ feedback information.

8. The method of claim 7, wherein the mapping table includes information that a sequence number (SN) of the HARQ frame is mapped to an ARQ SN of the at least one MAC PDU.

9. The method of claim 8, further comprising:
    updating an ARQ state variable to "success" in the mapping table if the HARQ feedback information indicates acknowledgement (ACK) information or an HARQ operation is successful within a preset number of times.

10. The method of claim 7, further comprising:
    performing an ARQ retransmission operation if the HARQ feedback information indicates non-acknowledgement (NACK) information and an HARQ operation has failed a preset number of times.

11. The method of claim 10, wherein the performing of an ARQ retransmission operation comprises:
receiving an allocation of a resource for transmission of ARQ feedback information from a base station (BS) included in a cellular communication system; and
transmitting the ARQ feedback information to the peer MS through the BS.

12. A mobile station (MS) in a device to device (D2D) communication system, the MS comprising:
a processor configured to:
perform a data communication with a peer MS using a D2D communication,
receive a resource block mapped to identification information related to a data retransmission between the MS and the peer MS from a base station,
receive feedback information for a retransmission operation for data, which is transmitted to the peer MS, which is transmitted using the resource block mapped to the identification information between the MS and the peer MS of a D2D connection from the peer MS,
determine whether there is a need for retransmission of the data based on the feedback information received from the peer MS, and
retransmit retransmission data to the peer MS if there is a need for the retransmission of the data,
wherein the retransmission data is retransmitted based on a hybrid automatic repeat request (HARQ) scheme,
wherein the retransmission data is retransmitted based on an automatic repeat request (ARQ) scheme if data retransmission based on the HARQ scheme fails, and
wherein the identification information of the D2D connection between the MS and the peer MS is managed by the base station as a D2D connection information related to the MS and the peer MS.

13. The MS of claim 12, wherein the feedback information includes feedback information for the HARQ scheme.

14. The MS of claim 12, wherein the feedback information is transmitted using a preset level of energy, or set to a preset value.

15. The MS of claim 12, wherein the identification information of the D2D connection includes a connection identifier (CID) of the D2D connection.

16. The MS of claim 15, wherein MS information corresponding to the CID and connection information including the CID are registered in a base station (BS).

17. The MS of claim 12, wherein the processor is further configured to:
generate a HARQ frame including at least one media access control packet data unit (MAC PDU),
generate a mapping table, where information on the HARQ frame is mapped to ARQ information of the at least one MAC PDU, and
transmit the HARQ frame to the peer MS using the D2D communication.

18. The MS of claim 17, wherein the processor is further configured to:
receive HARQ feedback information indicating whether the HARQ frame is received normally from the peer MS, and
update the mapping table based on the HARQ feedback information.

19. The MS of claim 18, wherein the mapping table includes information that a sequence number (SN) of the HARQ frame is mapped to an ARQ SN of the at least one MAC PDU.

20. The MS of claim 19, wherein the processor is further configured to update an ARQ state variable to "success" in the mapping table if the HARQ feedback information indicates acknowledgement (ACK) information or an HARQ operation is successful within a preset number of times.

21. The MS of claim 18, wherein the processor is further configured to perform an ARQ retransmission operation if the HARQ feedback information indicates non-acknowledgement (NACK) information and an HARQ operation has failed a preset number of times.

22. The MS of claim 21, wherein the processor is further configured to:
receive an allocation of a resource for transmission of ARQ feedback information from a base station (BS) included in a cellular communication system, and
transmit the ARQ feedback information to the peer MS through the BS.

23. A method for performing, by a mobile station (MS), a retransmission operation in a device to device (D2D) communication system, the method comprising:
performing a data communication with a peer MS using a D2D communication;
receiving a resource block mapped to identification information related to a data retransmission between the MS and the peer MS from a base station;
transmitting feedback information for a retransmission operation for data, which is received in the MS, which is transmitted using the resource block mapped to the identification information between the MS and the peer MS of a D2D connection to the peer MS; and
receiving retransmission data from the peer MS,
wherein the retransmission data is retransmitted based on a hybrid automatic repeat request (HARQ) scheme,
wherein the retransmission data is retransmitted based on an automatic repeat request (ARQ) scheme if data retransmission based on the HARQ scheme fails, and
wherein the identification information of the D2D connection between the MS and the peer MS is managed by the base station as a D2D connection information related to the MS and the peer MS.

24. The method of claim 23, wherein the feedback information includes feedback information for the HARQ scheme.

25. The method of claim 23, wherein the feedback information is transmitted using a preset level of energy, or set to a preset value.

26. The method of claim 23, wherein the identification information of the D2D connection includes a connection identifier (CID) of the D2D connection.

27. The method of claim 26, wherein MS information corresponding to the CID and connection information including the CID are registered in a base station (BS).

28. The method of claim 23, wherein the receiving of the data from the peer MS comprises:
receiving a HARQ frame from the peer MS using the D2D communication,
wherein the HARQ frame includes at least one media access control packet data unit (MAC PDU), and
wherein ARQ information of the at least one MAC PDU is managed in a mapping table, where information on the HARQ frame is mapped to the ARQ information of the at least one MAC PDU.

29. The method of claim 28, further comprising transmitting HARQ feedback information indicating whether the HARQ frame is received normally to the peer MS.

30. The method of claim 29, wherein the mapping table includes information that a sequence number (SN) of the HARQ frame is mapped to an ARQ SN of the at least one MAC PDU.

31. The method of claim 30, wherein an ARQ state variable of the mapping table is updated to "success" if the HARQ feedback information indicates acknowledgement (ACK) information or an HARQ operation is successful within a preset number of times.

32. The method of claim 29, further comprising:
receiving ARQ feedback information through a base station (BS) from the peer MS if the HARQ feedback information indicates non-acknowledgement (NACK) information and an HARQ operation has failed a preset number of times,
wherein a resource for transmission of the ARQ feedback information is allocated from the BS included in a cellular communication system.

33. A mobile station (MS) in a device to device (D2D) communication system, the MS comprising:
a processor configured to:
perform a data communication with a peer MS using a D2D communication,
receive a resource block mapped to identification information related to a data retransmission between the MS and the peer MS from a base station,
transmit feedback information for a retransmission operation for data, which is received in the MS, and which is transmitted using the resource block mapped to the identification information between the MS and the peer MS of a D2D connection to the peer MS, and
receive retransmission data from the peer MS,
wherein the retransmission data is retransmitted based on a hybrid automatic repeat request (HARQ) scheme,
wherein the retransmission data is retransmitted based on an automatic repeat request (ARQ) scheme if data retransmission based on the HARQ scheme is failure, and
wherein the identification information of the D2D connection between the MS and the peer MS is managed by the base station as a D2D connection information related to the MS and the peer MS.

34. The MS of claim 33, wherein the feedback information includes feedback information for the scheme.

35. The MS of claim 33, wherein the feedback information is transmitted using a preset level of energy, or set to a preset value.

36. The MS of claim 33, wherein the identification information of the D2D connection includes a connection identifier (CID) of the D2D connection.

37. The MS of claim 36, wherein MS information corresponding to the CID and connection information including the CID are registered in a base station (BS).

38. The MS of claim 33,
wherein the processor is further configured to receive a HARQ frame from the peer MS using the D2D communication,
wherein the HARQ frame includes at least one media access control packet data unit (MAC PDU), and
wherein ARQ information of the at least one MAC PDU is managed in a mapping table, where information on the HARQ frame is mapped to the ARQ information of the at least one MAC PDU.

39. The MS of claim 38, wherein the processor is further configured to transmit HARQ feedback information indicating whether the HARQ frame is received normally to the peer MS.

40. The MS of claim 39, wherein the mapping table includes information that a sequence number (SN) of the HARQ frame is mapped to an ARQ SN of the at least one MAC PDU.

41. The MS of claim 40, wherein an ARQ state variable of the mapping table is updated to "success" if the HARQ feedback information indicates acknowledgement (ACK) information or an HARQ operation is successful within a preset number of times.

42. The MS of claim 39,
wherein the processor is further configured to receive ARQ feedback information through a base station (BS) from the peer MS if the HARQ feedback information indicates non-acknowledgement (NACK) information and an HARQ operation has failed a preset number of times, and
wherein a resource for transmission of the ARQ feedback information is allocated from the BS included in a cellular communication system.

* * * * *